(12) United States Patent
Ritz et al.

(10) Patent No.: US 11,598,227 B2
(45) Date of Patent: Mar. 7, 2023

(54) ARTICULATED CHAIN WITH SLEEVE JOINTS ARRANGED AT AN ANGLE

(71) Applicant: iwis motorsysteme GmbH & Co. KG, Munich (DE)

(72) Inventors: Andreas Ritz, Munich (DE); Andreas Urbanek, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 0 days.

(21) Appl. No.: 17/361,203

(22) Filed: Jun. 28, 2021

(65) Prior Publication Data

US 2022/0010690 A1 Jan. 13, 2022

(30) Foreign Application Priority Data

Jul. 8, 2020 (DE) .......................... 102020117978.2

(51) Int. Cl.
| | | |
|---|---|---|
| *F01L 1/02* | (2006.01) | |
| *F16H 7/06* | (2006.01) | |
| *F16H 7/08* | (2006.01) | |

(52) U.S. Cl.
CPC ............. *F01L 1/022* (2013.01); *F16H 7/06* (2013.01); *F16H 2007/0812* (2013.01); *F16H 2007/0842* (2013.01); *F16H 2007/0872* (2013.01)

(58) Field of Classification Search
CPC .................................. F16H 7/06; F01L 1/022
See application file for complete search history.

(56) References Cited

U.S. PATENT DOCUMENTS

| 1,670,278 A | 5/1928 | Belcher | |
|---|---|---|---|
| 3,426,522 A * | 2/1969 | Onulak | ..................... B21L 9/04 59/8 |
| 3,583,153 A * | 6/1971 | Schafer | ................... B21L 9/065 59/8 |

(Continued)

FOREIGN PATENT DOCUMENTS

| CN | 101581350 A | 11/2009 |
|---|---|---|
| CN | 101749369 A | 6/2010 |

(Continued)

OTHER PUBLICATIONS

Search Report issued in Chinese Patent Application No. 202110767246.1 dated Jan. 11, 2023.

*Primary Examiner* — Kevin A Lathers
(74) *Attorney, Agent, or Firm* — BakerHostetler

(57) ABSTRACT

An articulated chain with alternating inner chain links and outer chain links which are each connected to each other by means of a chain joint, wherein each outer chain link comprises at least two outer link plates and two chain studs connecting them to each other, each inner chain link comprises at least two inner link plates and two joint sleeves connecting them to each other, and for forming a chain joint, one chain stud each of the outer chain link extends through a joint sleeve of the inner chain link. The joint sleeves of the inner chain links are embodied as winding sleeves and firmly connected to the inner link plates, wherein the sleeve joints of the two winding sleeves are positioned on the same side of a link plate's longitudinal axis and face each other, and the sleeve joints are arranged at a distance to the link plate's longitudinal axis and at a distance to an upper apex or to a lower inflection point of the winding sleeve.

14 Claims, 3 Drawing Sheets

(56) References Cited

U.S. PATENT DOCUMENTS

| | | | |
|---|---|---|---|
| 3,866,410 A | | 2/1975 | Zwinge |
| 5,267,909 A | * | 12/1993 | Iacchetta .................. F16G 13/18 |
| | | | 474/209 |
| 6,302,818 B1 | | 10/2001 | Haight |
| 6,330,788 B1 | * | 12/2001 | Winklhofer ............. F16G 13/06 |
| | | | 59/8 |
| 2009/0318254 A1 | | 12/2009 | Suko et al. |
| 2012/0302385 A1 | | 11/2012 | Pawlicki |

FOREIGN PATENT DOCUMENTS

| | | |
|---|---|---|
| CN | 107401582 A | 11/2017 |
| DE | 1 991 265 U | 8/1968 |
| DE | 102013212486 A1 | 12/2014 |
| EP | 1 070 873 A1 | 1/2001 |
| FR | 1381343 A | 12/1964 |
| GB | 1 261 282 A | 1/1972 |
| JP | 58-25840 A | 2/1983 |
| WO | 2003/067119 A1 | 8/2003 |

\* cited by examiner

ARTICULATED CHAIN WITH SLEEVE JOINTS ARRANGED AT AN ANGLE

CROSS-REFERENCE TO RELATED APPLICATIONS

This application claims priority to foreign German patent application No. DE 102020117978.2, filed on Jul. 8, 2020, the disclosure of which is incorporated by reference in its entirety.

FIELD OF THE INVENTION

The present invention relates to an articulated chain with alternating inner chain links and outer chain links which are each connected to each other by means of a chain joint, wherein each outer chain link comprises at least two outer link plates and two chain studs connecting them with each other, each inner chain link comprises at least two inner link plates and two joint sleeves connecting them to each other, and for forming a chain joint, one chain stud each of the outer chain link extends through one joint sleeve of the inner chain link, and wherein the joint sleeves of the inner chain links are embodied as winding sleeves and are firmly connected to the inner link plates.

Articulated chains are utilised in many different fields of technology for various purposes. One important field of application is the use as a timing chain in an internal combustion engine for controlling the combustion process. In such a timing drive, an articulated chain is subjected to high dynamic forces with high demands on the permanent loading capacity, material properties and quality of manufacture. Experience shows that here, the inner chain links are more susceptible to failure than the outer chain links as larger openings have to be provided in the inner link plates of the inner chain links in which the sleeves are arranged. In contrast, the openings in the outer link plates for receiving the chain studs have an essentially smaller diameter, which is why there remains a larger cross-section in the outer link plates for force transmission.

BACKGROUND

In many prior art articulated chains, simple winding sleeves are employed as joint sleeves which are wound of cold-rolled steel bands and replace expensive extruded joint sleeves without seam or joint. In the winding process, a band piece is, after it has passed through a straightener, cut off from the steel band, shaped around a winding spindle and pressed through different templates to shape a hollow-cylindrical winding sleeve. In the articulated chains with arbitrary arrangements of the winding sleeves in the inner link plates, it showed that with an arrangement of the sleeve joints in the external front side regions of the inner link plates, a clearly higher risk of failure is given at the inner chain links. Depending on the tensile load of the articulated chain, a very high premature wear of the joint sleeves occurs in the region of the sleeve joint in the external regions. The wear of the articulated chain generally mainly occurs in the chain joint where the opposed joint surfaces of the chain stud and the joint sleeve move mutually reversibly over a certain angular range. If the sleeve joint is located in this angular range, an increased abrasion between the two joint surfaces and an increased wear of the chain joint occur.

To improve the fatigue limit of the inner chain links, it is known to arrange the sleeve joints of the winding sleeve such that they are opposed on the link plate's longitudinal axis of the inner link plates. Corresponding methods and devices for manufacturing inner chain links and articulated chains where the sleeve joint of the winding sleeves are positioned in the centre of the inner link plates on the link plate's longitudinal axis are known from DE 1 752 557 A and U.S. Pat. No. 3,866,410 A. From citations EP 1 070 873 A1, JP-S58 025 840 A, and WO 2003/067119 A2, articulated chains are moreover known where the sleeve joint of the winding sleeve extends in an inclined, bent or curved manner towards the front side of the winding sleeve. Despite the various measures for arranging the sleeve joint of the winding sleeve within the inner chain link and for forming the sleeve joint itself, the fatigue limit of an articulated chain with joint sleeves of the inner chain links embodied as winding sleeves is clearly reduced compared to extruded joint sleeves free from sleeve joints.

With respect to the articulated chains known from prior art with joint sleeves of the inner link plates embodied as winding sleeves, there therefore is a demand to reduce the wear of the chain joints and to increase the fatigue limit of the inner chain links to increase the operational safety and lifetime of the articulated chains. The progressing technical development requires, just in the field of internal combustion engines and even with already well-established components, a constant innovation pressure and the demand to improve existing concepts. With respect to the constant cost pressure existing in the automobile industry in connection with high piece numbers, a general constant demand for optimisation moreover results.

SUMMARY OF THE INVENTION

It is therefore an object of the present invention to improve an articulated chain of the type mentioned in the beginning with respect to its fatigue limit and durability.

This object is achieved in a generic articulated chain in that a sleeve joint of the winding sleeve is arranged at an angle of 120° to 140° with respect to the link plate's longitudinal axis, wherein the angle is measured between the longitudinal axis extending through the centre of the sleeve and a leg connecting the centre of the joint sleeve and the sleeve joint. Here, the external point of intersection of the joint sleeve with the link plate's longitudinal axis is also referred to as the 0° position of the sleeve joint position. Such a sleeve joint position between 120° and 140° has an influence on the fatigue limit of the articulated chain. In contrast to the articulated chains known from prior art, where the sleeve joints are arranged at an angle of 180° with respect to the link plate's longitudinal axis and face each other in the centre of the inner link plate, the sleeve joint position between 120° and 140° permits, apart from a comparable fatigue limit of the inner link plates, also an improvement of the fatigue limit of the joint sleeves and thus an improvement of the overall durability of the inner chain links or the complete articulated chain. In an optimal position, the sleeve joint is at 130°, wherein the distance to the borders of the employed angular range of +1-10° can be utilised for a facilitated assembly.

For a secure fatigue limit of the inner link plates, the sleeve joints of the two winding sleeves of the inner link plates can face each other, so that the sleeve joint position is measured each between an external point of intersection of the sleeve with the link plate's longitudinal axis and the leg between the centre of the sleeve and the sleeve joint. Here, the external point of intersection of the joint sleeve with the link plate's longitudinal axis is also referred to as the 0° position of the sleeve joint position.

A particular embodiment provides that the sleeve joints of the two winding sleeves of the inner link plates are positioned on a longitudinal side's half of the inner link plate facing away from the chain wheels in the operation of the articulated chain. When the chain wheels engage the articulated chain and when the teeth of the chain wheels roll on the joint sleeves, an increased load on the joint sleeve occurs and can lead to increased wear in the region of the sleeve joint of the winding sleeve. This is prevented by positioning the sleeve joints on the longitudinal side's half facing away from the engagement of the chain wheels above the link plate's longitudinal axis extending through the centres of the joint sleeves.

A suitable embodiment provides that the sleeve joint extends perpendicularly to the front side of the winding sleeve. This facilitates, in the manufacture of the winding sleeves from a steel band, the exact cutting off of the band piece and the shaping of the band piece around a winding spindle and through different templates into a cylindrical winding sleeve.

To lubricate the chain joint and the friction bearing surfaces of the chain stud and the joint sleeves inside the chain joint, the winding sleeve can have an opening in its shell, preferably in the region of the sleeve joint. The supply of a lubricant, for example engine oil, reduces the wear of the friction bearing surfaces of the chain joint and correspondingly improves the durability of the articulated chain. Such an opening can be particularly easily manufactured by providing the opening in the region of the sleeve joint. The opening in the region of the sleeve joint can be provided during the cutting-out of the band piece from the steel band for the winding sleeve at the two front sides for the sleeve joint by two recesses being embodied at the joint edges of the winding sleeve, so that the opening in the shell of the winding sleeve automatically results by the winding process of the band piece.

A preferred embodiment provides that the winding sleeves are pressed into corresponding sleeve openings of the inner link plates to embody the inner chain link. The pressing of the winding sleeves into corresponding sleeve openings permits, apart from a simple firm connection of the winding sleeves with the inner link plates of the inner chain link, also a secure positioning of the sleeve joints of the winding sleeve in a predetermined sleeve joint position.

A useful modification provides that the winding sleeves of the inner chain links are made of a low alloy steel, in particular of a 10NC6 steel material. A low alloy steel, and in particular a 10NC6 steel material, permits an exact cutting-off of the band piece from a steel band and the shaping of the band piece into a winding sleeve, and simultaneously also a high tensile strength and fatigue limit by means of a subsequent heat treatment, e. g. case-hadening. Preferably, the winding sleeves can here be wound of a band piece of a cold-rolled precision steel band to permit particular high precision and accuracy to size of the winding sleeves.

According to a further embodiment, the inner link plates of the inner chain links can be made of a tempering steel, in particular of a C45E, C60 or 42CrMo4 steel material. The use of a tempering steel for the manufacture of the inner chain links permits, apart from an easy and exact punching-out of the inner link plates with low proportions of break of the cut edges, also a high tensile strength and fatigue limit by subsequent tempering.

Furthermore, the invention relates to a chain drive for an internal combustion engine, in particular to a timing chain drive, with a drive chain wheel, at least one driven chain wheel, and an articulated chain according to one of the embodiments described above, wherein the articulated chain is engaged with the drive chain wheel and the driven chain wheel. By the particular design of the articulated chain, this chain drive can be provided for an internal combustion engine with a high stability under load and operational safety despite the use of inexpensive components and manufacturing processes.

BRIEF DESCRIPTION OF THE DRAWINGS

Below, exemplary, not restricting embodiments of the present invention will be illustrated more in detail with reference to drawings. In the drawings.

DETAILED DESCRIPTION

Figure 1:
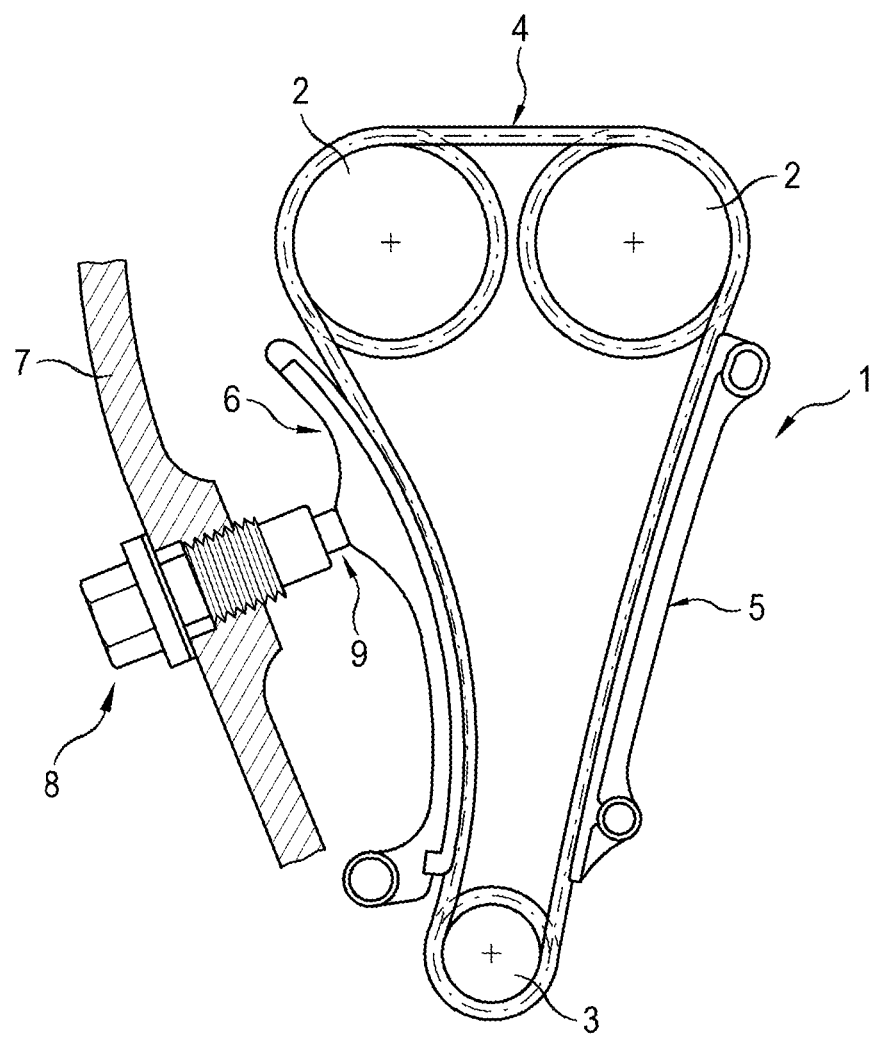
FIG. 1 shows a schematic representation of a chain drive according to the invention.

In FIG. 1, a chain drive 1 for an internal combustion engine is represented. This chain drive 1 embodied as a timing drive comprises two camshaft driven chain wheels 2 situated at the top, one crankshaft drive chain wheel 3 situated at the bottom, and an endless articulated chain 4 guided around them. In the tight side of the chain drive 1, a guide rail 5 is arranged along which the articulated chain 4 is sliding. On the opposite slack side of the chain drive 1, there is a tensioning rail 6 pivoted in the proximity of the crank shaft drive chain wheel 3 which is pressable against the articulated chain 4 by means of a chain tensioner 8 screwed into an engine casing 7 to thus pretension the slack side of the chain drive 1. The chain tensioner 8 is usually connected to the engine oil hydraulics, so that a tensioning piston 9 hydraulically presses onto the pivoted tensioning rail 6. The chain tensioner 8 is, in the present embodiment in FIG. 1, embodied as a screw-in chain tensioner which is screwed into the engine casing 7 and presses onto the tensioning rail 6 which is thus pressed against the articulated chain 4 with a predetermined force. As an alternative, the chain tensioner 8 can also be embodied as a flange tensioner.

Figure 2:
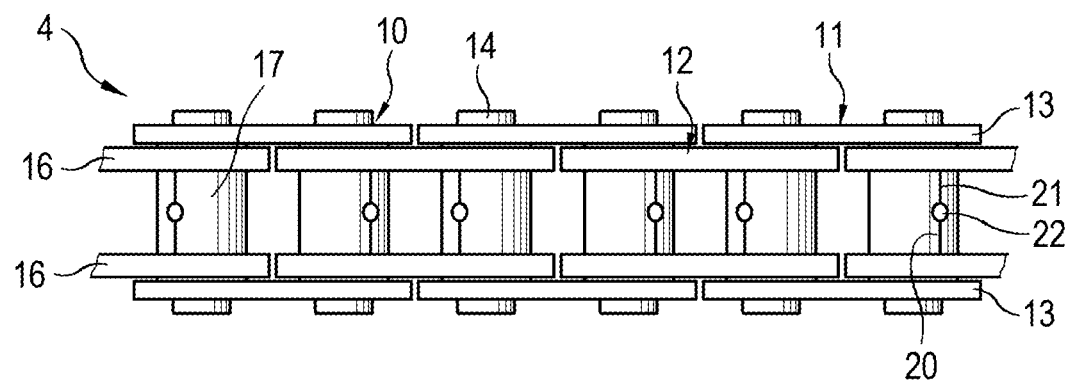
FIG. 2 shows a plan view of an articulated chain according to the invention.

With reference to the plan view onto an inventive articulated chain 4 shown in FIG. 2, the outer chain links 11 and inner chain links 12 alternatingly connected to each other by means of a chain joint 10 are obvious. Each outer chain link 11 consists of two outer link plates 13 arranged at a distance with respect to each other and two cylindrically shaped chain studs 14 connecting them to each other. To this end, the chain studs 14 are pressed into corresponding stud openings 15 in the outer link plates 13, see FIG. 3, so that they slightly project to the outside. Each inner chain link 12 consists of two inner link plates 16 arranged at a distance with respect to each other which are connected to each other by means of two joint sleeves 17 arranged at a distance with respect to each other. To this end, the joint sleeves 17 are pressed into corresponding sleeve openings 18 of the inner link plates 16.

The chain stud 14 of an outer chain link 11 and the corresponding joint sleeve 17 of an inner chain link 12 through which the chain stud 14 extends together form the chain joint 10. As is obvious from FIG. 2, the thickness of the inner link plates 16 is somewhat greater for stability reasons since for pressing in the joint sleeves 17 into the sleeve openings 18, a larger diameter is required compared to the stud openings 15. Each outer link plate 13 and each inner link plate 16 has corresponding link plate backs 19 arranged in parallel with respect to each other in the outer contour extension at the upper side and the bottom side.

Figure 3:
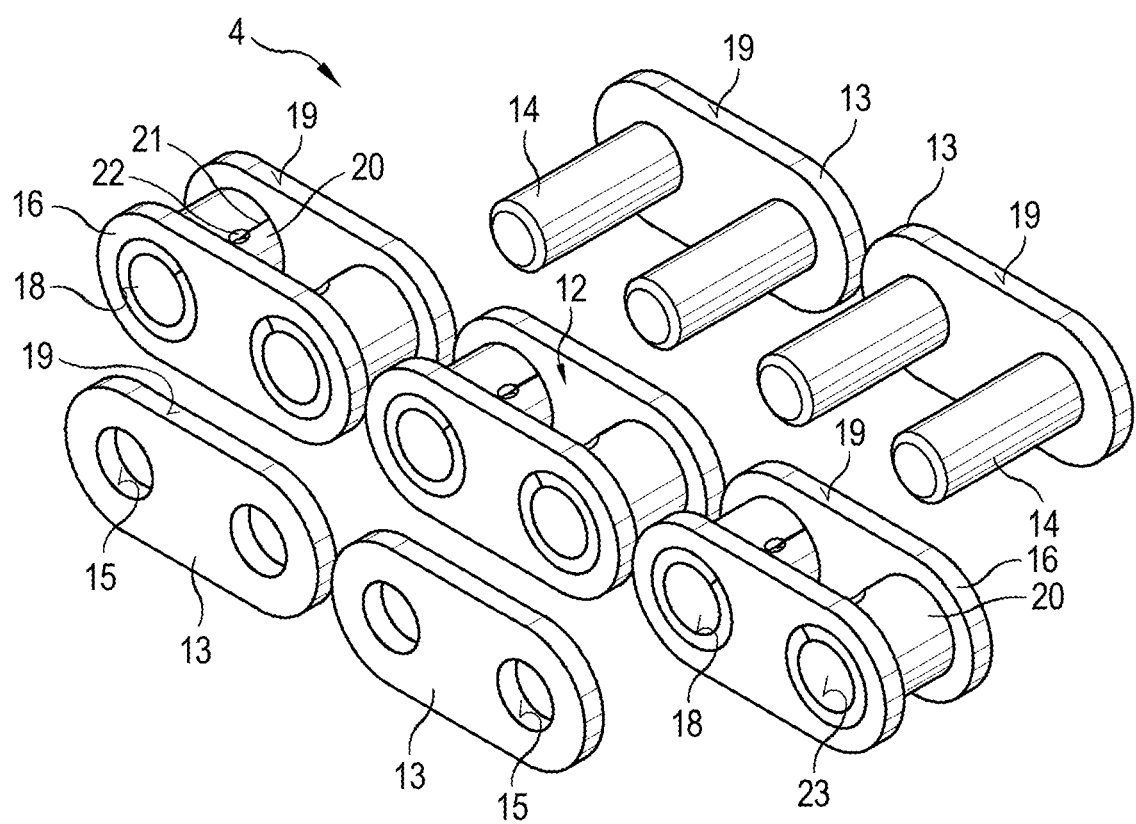
FIG. 3 shows an exploded view of the articulated chain of FIG. 2 according to the invention.

As can be clearly seen in FIG. 2 and FIG. 3, the joint sleeves 17 are embodied as winding sleeves 20. The winding sleeves 20 each have a sleeve joint 21 in the centre of which a lubrication opening 22 is provided. The winding sleeves 20 are wound from a cold-rolled precision steel band, for example a 10NC6 steel band, wherein for the winding process, a band piece is initially cut from the steel band after it has passed a straightener, is then shaped around a winding spindle and pressed through different templates to obtain the cylindrical winding sleeve 20. After the winding sleeves 20 have been pressed with the sleeve openings 18 of the inner link plates 16 to produce the inner chain link 12, the two cutting edges of the band piece abut against each other and form the sleeve joint 21 of the winding sleeve 20. When the band piece is cut off from the steel band, in the centre of the cut edge, a semi-circular recess can be provided which connects, after the winding process of the band piece, to a corresponding second semi-circular recess at the second cut edge to form the lubrication opening 22 in the winding sleeve 20. The lubrication of the chain joint 10 is effected via this lubrication opening 22.

In the exploded view in FIG. 3, apart from the structure of the articulated chain, its assembly can also be seen. The articulated chain 4 is composed of alternatingly arranged inner chain links 12 and outer chain links 11. The inner chain links 12 each consist of two inner link plates 16 and two winding sleeves 20 pressed into the sleeve openings 18 of the inner link plates 16. In the process, the winding sleeves 20 are positioned, during the pressing of the inner chain links 12, such that the sleeve joints 21 of the two winding sleeves 20 of the inner chain link 12 are positioned in a sleeve joint position between 120° and 140° and face each other. During the assembly of the inner chain links 12 with the outer chain links 11, the chain studs 14 are initially only pressed into the stud openings 15 of an outer link plate 13 and then pushed, in order to form the chain joint 10, through the joint openings 23 of the winding sleeves 20 of two adjacent inner chain links 12 before the second outer link plate 13 is pressed onto the ends of the chain studs 14 projecting from the joint openings 23.

Figure 4:
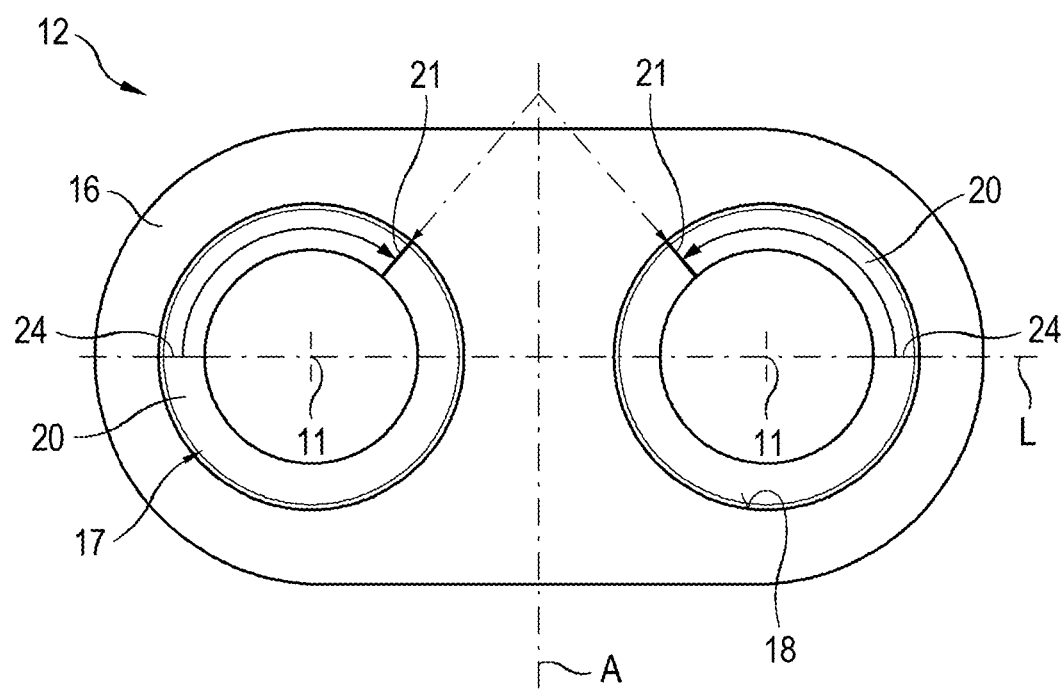
FIG. 4 shows an enlarged side view of an inner chain link of the articulated chain of FIGS. 2 and 3 according to the invention.

FIG. 4 shows in detail the position of the sleeve joints 21 of the winding sleeves 20 in the inner link plates 16 of the inner chain links 12. The link plate's longitudinal axis L of the inner link plates 16 extends through the centre M of the winding sleeves 20 pressed into the sleeve openings 18. Here, the external point of intersection of the winding sleeves 20 with the link plate's longitudinal axis L is referred to as the 0° position 24 of the sleeve joint position. Starting from the 0° position 24, in an inventive articulated chain 4, the angular position of the sleeve joint 21 of the winding sleeves 20 in the inner link plates 16 of the inner chain links 12 is within a range between 120° to 140°, wherein the sleeve joints 21 are opposite each other on the same longitudinal side's half of the inner link plates 16. The sleeve joint position is measured each between the 0° position 24 on the link plate's longitudinal axis L extending through the centre M of the winding sleeve 20, i.e. the external points of intersection of the winding sleeves 20 with the link plate's longitudinal axis L, and a leg connecting the centre M of the winding sleeve 20 and the sleeve joint 21, wherein the angles open into different directions, so that the sleeve joints 21 of the two winding sleeves 20 are positioned symmetrically to a central axis A of the inner link plate 16, i.e. the sleeve joints 21 of the two winding sleeves 20 of the inner link plates 16 face each other and are positioned on the same side of the link plate's longitudinal axis L. In other words the sleeve joints 21 of the two winding sleeves 20 of the inner link plates 16 are arranged at a distance to the link plate's longitudinal axis L and at a distance to the upper apex or to the lower inflection point of the winding sleeve, wherein upper apex and lower inflection point are perpendicular to the centre M. The quarter angle of the winding sleeve 20 between the inner point of intersection with the link plate's longitudinal axis L and the upper apex or the lower inflection point is subdivided into three sectors of approximately the same size each, and the sleeve joints 21 of the two winding sleeves 20 are arranged in the central sector, wherein the central sector extends at an angle of 120° to 140°, measured from the outer point of intersection of the winding sleeves 20 with the link plate's longitudinal axis L. Correspondingly, the sleeve joints 21 of both winding sleeves 20 of the inner chain link 12 are preferably positioned on the longitudinal side's half of the inner link plate 16 at the top with respect to the link plate's longitudinal axis L, which faces away from the drive chain wheels 2 and the driven chain wheel 3 of a chain drive 1 in the operation of the articulated chain 4, so that during the engagement of the chain wheels 2, 3 into the articulated chain 4, the teeth of the chain wheels 2, 3 do not roll over the sleeve joints 21 of the winding sleeves 20.

The sleeve joint position of the sleeve joints 21 of the winding sleeves 20 of the inner chain links 12 of an inventive articulated chain 4 improves the fatigue limit both of the joint sleeves 17 and of the inner link plates 16 of the inner chain links 12 and simultaneously avoids the disadvantages occurring in a perpendicular or horizontal positioning of the sleeve joints 21. In contrast to the arbitrary positioning of the sleeve joints 21 of the winding sleeves 20 known from prior art, and the positioning of the sleeve joints 21 facing each other on the link plate's longitudinal axis L or perpendicular to the centre M of the winding sleeve 20, the sleeve joint position between 120° and 140° provided in the inventive articulated chain 4 permits a uniform optimisation of the fatigue limit of the joint sleeve 17 and the inner link plates 16 without compensating corresponding disadvantages for the respective other component via other construction parameters.

LIST OF REFERENCE NUMERALS 1 chain drive
2 driven chain wheels
3 drive chain wheel
4 articulated chain
5 guide rail
6 tensioning rail
7 engine casing
8 chain tensioner
9 tensioning piston
10 chain joint
11 outer chain links
12 inner chain links
13 outer link plates
14 chain studs
15 stud openings
16 inner link plate
17 joint sleeves
18 sleeve openings 19 link plate back
20 winding sleeves
21 sleeve joint
22 lubrication opening
23 joint opening
24 0° position
A central axis
L link plate's longitudinal axis
M centre

The invention claimed is:

1. An articulated chain with alternating inner chain links and outer chain links which are each connected to each other by means of a chain joint,
   each outer chain link comprises at least two outer link plates and two chain studs connecting them to each other, and
   each inner chain link comprises at least two inner link plates and two joint sleeves connecting the inner link plates to each other, the two joint sleeves forming a chain joint, wherein one chain stud of the adjacent outer chain links each extends through one joint sleeve of the inner chain link, and
   wherein the joint sleeves of the inner chain links are embodied as winding sleeves having a sleeve joint and are firmly connected to the inner link plates, wherein the sleeve joints of the two winding sleeves are positioned on the same side of a link plate's longitudinal axis and face each other, the sleeve joints are arranged at a distance to the link plate's longitudinal axis and at a distance to an upper apex or to a lower inflection point of the winding sleeve, wherein upper apex and lower inflection point are perpendicular to the centre, and wherein a quarter angle sector of the winding sleeve between the inner point of intersection with the link plate's longitudinal axis and the upper apex or the lower inflection point is subdivided into three sectors of approximately the same size each, and the sleeve joints of the two winding sleeves are arranged in a central sector.

2. The articulated chain according to claim 1, wherein the central sector extends at an angle of 120° to 140°, measured from the outer point of intersection of the winding sleeves with the link plate's longitudinal axis.

3. The articulated chain according to claim 1, wherein the sleeve joints of the two winding sleeves of the inner link plates are positioned on a longitudinal side's half of the inner link plate which faces away from chain wheels in the operation of the articulated chain.

4. The articulated chain according to claim 1, wherein the sleeve joint extends perpendicularly to a front side of the winding sleeve.

5. The articulated chain according to claim 1, wherein the winding sleeve has a lubrication opening in a shell.

6. The articulated chain according to claim 5, wherein the winding sleeve has a lubrication opening in the region of the sleeve joint.

7. The articulated chain according to claim 1, wherein the winding sleeves are pressed into corresponding sleeve openings of the inner link plates to form the inner chain link.

8. The articulated chain according to claim 1, wherein the winding sleeves of the inner chain links are made of low alloy steel.

9. The articulated chain according to claim 8, wherein the winding sleeves of the inner chain links are made of a 10NC6 steel material.

10. The articulated chain according to claim 8, wherein the winding sleeves are wound of a band piece of a cold-rolled precision steel band.

11. The articulated chain according to claim 1, wherein the inner link plates of the inner chain links are made of a tempering steel.

12. The articulated chain according to claim 11, wherein the inner link plates of the inner chain links are made of a C45E, C60 or 42CrMo4.

13. A chain drive for an internal combustion engine, in particular timing chain drive, with a drive chain wheel, at least one driven chain wheel, and an articulated chain having inner chain links, the chain links comprising at least two inner link plates and two joint sleeves connecting the inner link plates to each other, wherein the joint sleeves of the inner chain links are embodied as winding sleeves having a sleeve joint and are firmly connected to the inner link plates, the sleeve joints of the two winding sleeves are positioned on the same side of the link plate's longitudinal axis and face each other, wherein the sleeve joints are arranged at a distance to the link plate's longitudinal axis L and at a distance to the upper apex or to the lower inflection point of the winding sleeve, and
   wherein the articulated chain is engaged with the drive chain wheel and the driven chain wheel, and
   wherein a quarter angle sector of the winding sleeve between an inner point of intersection with the link plate's longitudinal axis and the upper apex or the lower inflection point is subdivided into three sectors of approximately the same size each, and the sleeve joints of the two winding sleeves are arranged in a central sector.

14. The chain drive for an internal combustion engine according to claim 13, wherein the sleeve joints of the two winding sleeves of the inner link plates are positioned on a longitudinal side's half of the inner link plate which faces away from the drive chain wheel and the driven chain wheel.

* * * * *